United States Patent
Tick

(12) 
(10) Patent No.: US 6,281,151 B1
(45) Date of Patent: Aug. 28, 2001

(54) TRANSPARENT LANTHANUM FLUORIDE GLASS-CERAMICS

(75) Inventor: Paul A. Tick, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/463,368

(22) PCT Filed: Jun. 11, 1998

(86) PCT No.: PCT/US98/12262

§ 371 Date: Jan. 24, 2000

§ 102(e) Date: Jan. 24, 2000

(87) PCT Pub. No.: WO99/05071

PCT Pub. Date: Feb. 4, 1999

Related U.S. Application Data

(60) Provisional application No. 60/053,588, filed on Jul. 24, 1997.

(51) Int. Cl.[7] ............................. C03C 10/16; C03C 3/247
(52) U.S. Cl. .................................. 501/3; 501/44; 501/50; 501/51; 65/33.3
(58) Field of Search .................................. 501/3, 44, 50, 501/51; 65/33.3

(56) References Cited

U.S. PATENT DOCUMENTS

| | | | |
|---|---|---|---|
| 4,032,351 | 6/1977 | Auzel et al. | 501/3 |
| 4,674,835 | 6/1987 | Mimura et al. | 350/96.34 |
| 5,420,080 | 5/1995 | Wang et al. | 501/3 |
| 5,545,595 | 8/1996 | Wang et al. | 501/3 |

*Primary Examiner*—Karl Group
(74) *Attorney, Agent, or Firm*—Angela N. Nwaneri

(57) ABSTRACT

The present invention relates to a transparent glass-ceramic material which includes a glass matrix and a crystalline phase of lanthanum fluoride crystals in the glass matrix, where the transparent glass-ceramic material contains no silica. The present invention further relates to a method of producing the transparent glass-ceramic material.

23 Claims, 5 Drawing Sheets

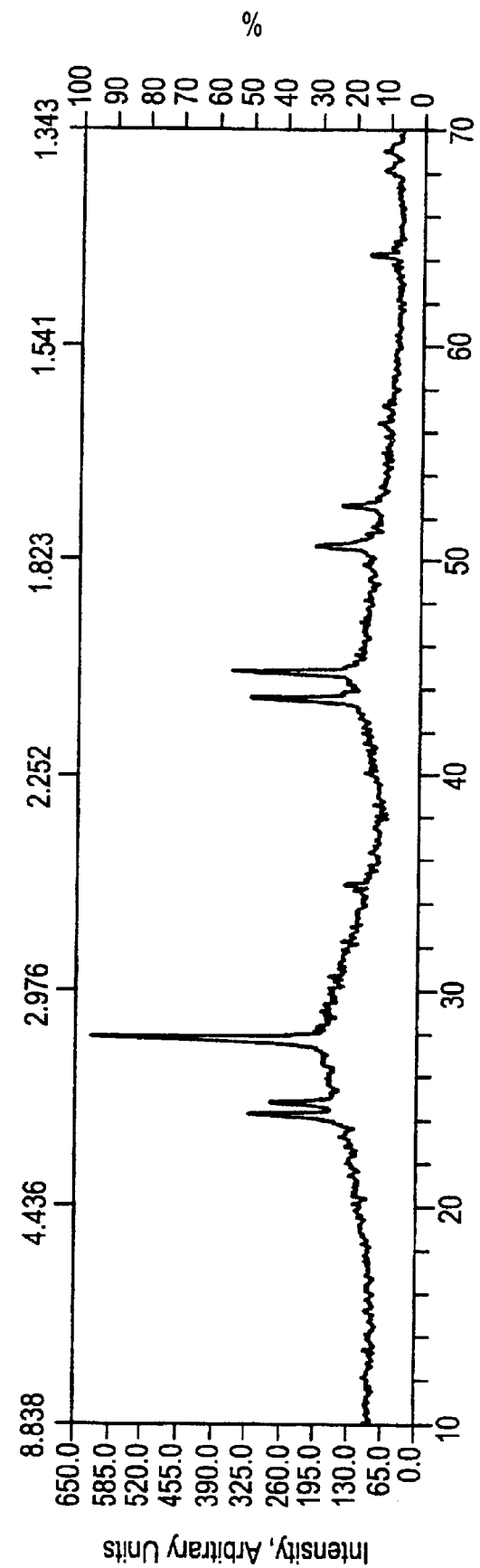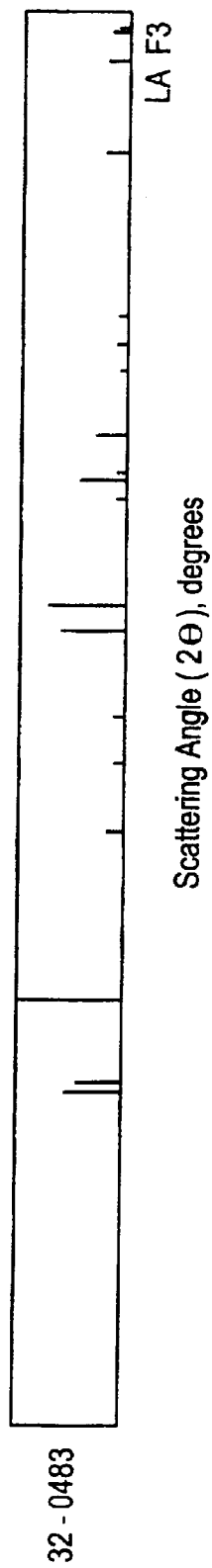
FIG.3A
FIG.3B
LANTHANUM FLUORIDE / FLUOCERITE - (LA), SYN

TRANSPARENT LANTHANUM FLUORIDE GLASS-CERAMICS

This application claims benefit of provisional application 60/053,588 filed Jul. 24, 1997.

FIELD OF THE INVENTION

The present invention relates to a transparent glass-ceramic material and a method of making the material.

BACKGROUND OF THE INVENTION

Recently, transparent materials capable of efficient frequency upconversion, most being various rare-earth ion-doped fluoride glasses and crystals, have received great attention due to the possibilities of utilizing these materials to achieve blue or green solid state lasers. While no significant difference in upconversion efficiency is observed between fluoride glasses and single crystals, single mode optical fiber doped with a low level of rare-earth ions can be drawn from fluoride glasses, bringing about highly efficient blue or green upconversion fiber lasers. Unfortunately, heavy metal fluoride glasses suffer certain undesirable attributes which have restricted their applications. Most notably, heavy metal fluoride glasses exhibit poor resistance to devitrification. U.S. Pat. No. 4,674,835 to Mimura et al. discusses the crystallization problems of heavy metal fluoride glasses, one example of which is called ZBLAN, and the light scattering problems resulting therefrom.

The great susceptibility of heavy metal fluoride glasses to devitrification also generates problems in forming large preforms. Crystallization at the interface between the core and cladding, during the production of the preform, causes problems in the most commonly used methods for preparing an optical fiber. That is, heavy metal fluoride glasses are quite prone to inhomogeneous nucleation, the consequence of which being crystallization at the core and cladding interfaces, particularly during the drawing of the optical fiber. The resulting fibers are subject to serious scattering losses due to crystals in the fibers.

Devitrification of the heavy metal fluoride glasses is aggravated when ions necessary to impart differences in indices of refraction to the core and cladding are added to the glass composition. Additional doping, for example, with rare-earth metal ions, also tends to reduce the stability of the glass. As a consequence of those problems, research has focused on finding additives which will reduce the tendency of the glass to devitrify and to increase the chemical stability thereof. In addition, the preparation of fluoride glasses requires the glass forming components to be reheated to their softening temperatures, which generally are about 75° C. above the glass transition temperatures. In addition, fluoride glasses cannot be melted in air but require a water-free, inert gas environment.

Most oxide glasses (such as silica dioxide) are much more chemically and mechanically stable, are easier to prepare, and are more easily fabricated into rods, optical fibers, or planar waveguides than fluoride glasses. Unfortunately, due to their larger phonon energy, silica glasses are very inefficient for infrared upconversion. It has also been shown that addition of oxides into some fluoride glasses improve their stability, but this is not preferred, since even a small addition of oxides will significantly quench the upconversion luminescence. Early in 1975, Auzel et al., *J. Electrochem. Soc.*, 122:101 (1975) reported an interesting class of infrared ("IR") upconversion materials which were prepared from classical glass forming oxides ($SiO_2$, $GeO_2$, $P_2O_6$, etc. with $PbF_2$ and rare-earth oxides), and showed an efficiency nearly twice as high as $LaF_3$:Yb:Er phosphor. Since these kinds of materials were comprised of a mixture of glassy and crystalline phases, and the embedded crystals were very large in size (around 10 μm), they were not transparent.

In Wang et al., "New Transparent Vitroceramics Codoped With $Er^{3+}$ and $Yb^{3+}$ For Efficient Frequency Upconversion," *Appl Phys. Lett,* 63(24):3268–70 (1993), transparent oxyfluoride vitroceramics (also called glass-ceramics) containing oxides of large phonon energy, like $SiO_2$ and $AlO_{1.5}$, but showing IR to visible upconversion more efficient than fluoride glass was described. The composition of Wang contained, expressed in terms of mole percent,

| $SiO_2$ | 30 | $CdF_2$ | 20 |
|---|---|---|---|
| $AlO_{1.5}$ | 15 | $YbF_3$ | 10 |
| $PbF_2$ | 24 | $ErF_3$ | 1 |

The glass produced from that composition was heat treated at 470° C. to develop nanoocrystallites which the authors stated did not reduce the transparency of the body. The authors posited that the $Yb^{3+}$ and $Er^{3+}$ ions were preferentially segregated from the precursor glass and dissolved into the nanocrystals upon heat treatment. The size of the nanocrystallites was estimated by the authors to be about 20 nm; that size being so small that light scattering loss was minimal. The authors reported the upconversion efficiency of their products to be about 2 to 10 times as high as that measured on the precursor glass and other fluoride-containing glasses. However, the crystals which are formed in the Wang glass have a cubic lattice structure and this limits the concentration of some of the trivalent rare-earth elements which may be incorporated into the crystal phase. Another problem with these materials is that they require cadmium in the formulation. Cadmium is a carcinogen and, thus, its use is restricted. Hence this type of glass would not be desirable for any large scale manufacturing operation.

The present invention is directed toward overcoming these above-noted deficiencies,

SUMMARY OF THE INVENTION

The present invention relates to a transparent glass-ceramic material which includes a glass matrix and a crystalline phase of lanthanum fluoride crystals in the glass matrix, where the transparent glass-ceramic material does not contain silica.

Another aspect of the present invention relates to a method of making a transparent glass-ceramic material which includes providing a glass matrix and treating the glass matrix under conditions effective to produce the transparent glass-ceramic material which includes a glass matrix and a crystalline phase of lanthanum fluoride crystals in the glass matrix, where the transparent glass-ceramic material does not contain silica.

Transparent glasses containing crystals are highly desirable in applications where there is a requirement for the glass to be easily melted or formed and additionally to contain a crystal, where the crystal itself may be difficult or expensive to synthesize. Such transparent glasses, containing lanthanum fluoride crystals, are especially desirable where the crystal itself provides highly desirable features, such as optical activity. In addition, the glass-ceramics of the present invention are easily produced and can be melted at low temperature relative to many silicate glasses, in air.

Further, lanthanum fluoride has the particular advantage of being able to accommodate large concentration of any rare-earth element into its crystal structure and is not a carcinogen.

BRIEF DESCRIPTION OF THE DRAWINGS

FIGS. 3a and 3b are an X-ray diffraction pattern of a glass-ceramic of the present invention.

DETAILED DESCRIPTION OF THE INVENTION

Figure 1:
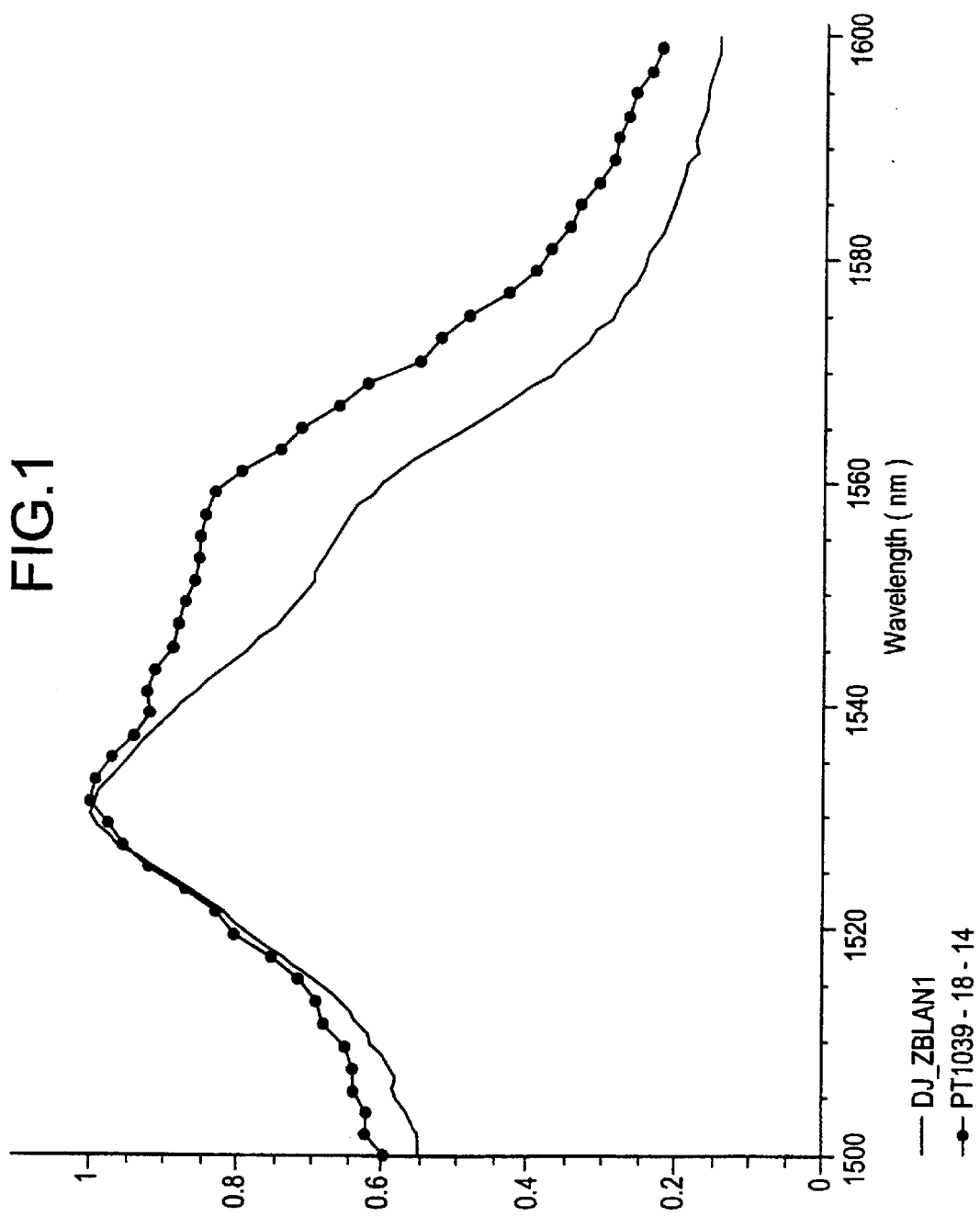
FIG. 1 is a graph comparing the emission spectra of a glass-ceramic of the present invention with a fluoride glass at 1550 nm.

The present invention relates to a transparent glass-ceramic material which includes a glass matrix and a crystalline phase of lanthanum fluoride crystals in the glass matrix, where the transparent glass-ceramic material does not contain silica.

Another aspect of the present invention relates to a method of making a transparent glass-ceramic material, which includes providing a glass matrix and treating the glass matrix under conditions effective to produce the transparent glass-ceramic material, which includes a glass matrix and a crystalline phase of lanthanum fluoride crystals in the transparent glass-ceramic material, where the glass-ceramic material does not contain silica.

Preferably, the transparent glass-ceramic materials include lanthanum fluoride crystals having uniform size distribution and interpartical separations of the order of 10–40 nanometers. Further, it is preferable for the size of each crystal of the crystalline phase to be in the range of about 5–15 nanometers. Further, the glass-ceramic material of the present invention preferably contains from about 5% to about 30% by volume crystals. Thus, an "ultra-transparent" glass-ceramic is produced, which is useful for doping with active rare-earth elements. "Ultra-transparent" signifies that the glass-ceramic material of the present invention, when doped with active rare-earth elements, has optical scattering properties which are indistinguishable from a glass, in particular, having minimal light scattering loss.

It is desirable for the transparent glass-ceramic composition to include 45 to 55 wt. % $LaF_3$, 20–25 wt. % $B_2O_3$, 10–20 wt. % $Al_2O_3$, and 10–15 wt. % $BaF_2$. Optionally, the composition may also include 0–15 wt. % $PbF_2$, 0–10 wt. % $Y_2O_3$ and 0–10 wt. % $Ta_2O_5$.

In addition, the transparent glass composition may include fluorides or oxides of one or more rare-earth elements other than lanthanum. Preferably, the composition includes from 0–5 wt. % fluorides or oxides of these additional rare-earth elements. The additional rare-earth elements are Y, Ce, Pr, Nd, Pm, Sm, Eu, Gd, Tb, Dy, Ho, Er, Tm, Yb, and Lu.

The rare-earth elements may be contained entirely in the crystalline phase. Alternatively, the rare-earth elements are contained both in the glass matrix and in the crystalline phase.

The transparent glass-ceramic material is produced by providing a glass matrix and treating the glass matrix under conditions effective to produce the transparent glass-ceramic material, which includes a glass matrix and a crystalline phase of lanthanum fluoride crystals in the glass matrix, wherein the glass-ceramic material does not contain silica.

Optionally, the glass matrix is provided as a formed glass shape. Alternatively, the glass matrix is provided by producing the glass matrix. The glass matrix is produced by any traditional glass making procedure. For example, glass components which include alkoxides and are formulated to produce a glass matrix having the desired composition are used in a sol gel approach, such as disclosed in U.S. Pat. No. 5,494,863 to Mathur, which is hereby incorporated by reference, to produce the glass matrix. In addition, for example, the glass matrix may be produced using chemical vapor deposition techniques.

A particularly preferred way of providing the glass matrix is by producing the glass matrix through traditional melting and forming techniques. Preferably, the glass matrix is produced by first melting together batch components calculated to produce a glass matrix having the desired composition to give a glass melt. Importantly, no silica is utilized. Preferably, the glass components are melted at temperatures from about 1000° C. to about 1200° C. for from about 0.25 to about 2 hours. Next, the glass melt is formed into a glass shape. Suitable forming procedures include rolling, pressing, casting, or fiber drawing. The glass shape is then preferably a patty, rod, sheet, or fiber.

Subsequently, the glass matrix provided is treated under conditions effective to produce a transparent glass-ceramic material having a glass matrix and a crystalline phase of lanthanum fluoride crystals in the glass matrix.

Preferably, the treating step is achieved by heating the glass matrix to ceram the glass matrix. The heating step is designed to promote phase separation and crystallization of the lanthanum fluoride phase, producing a glass-ceramic material which includes a crystalline phase of lanthanum fluoride in a glass matrix. Preferably, the glass matrix is heated in a heating step at a temperature from about 600° C. to about 700° C. The exact heat treatment temperature is determined by the crystallization behavior of the lanthanum fluoride phase, which can be determined by differential thermal analysis. The glass matrix is then cooled to room temperature. Perferably, the article is rapidly cooled to the anneal temperatures (about 560° C.), then cooling proceeds at a rate sufficient to remove residual stresses.

The transparent glass-ceramic material is especially useful where a glass matrix, which is easily melted or easily formed, is desired or where the glass matrix contains a crystalline phase which may be difficult or expensive to produce.

Further, a transparent glass-ceramic material which includes lanthanum fluoride crystals in the glass matrix, is especially useful where the crystals act as selective hosts for other rare-earth elements. A dramatic change is observed in the emission spectra of $ErF_3$ doped lanthanum fluoride glasses after ceramming, indicating significant partitioning of the rare-earth element into the crystal phase.

It is not necessary to have complete partitioning of the rare-earth element into the crystalline phase. For certain applications, such as gain-flattened amplifiers, for example, a combination of $Er^{3+}$ in the glass matrix and in the crystalline phase may be optimal. This permits tailoring of the site sizes and geometries of the lanthanum fluoride crystals to optimize the local environments of any dopant lanthanide ions.

EXAMPLES

Example 1

Various precursor glass materials were produced as follows. Glass forming batch materials calculated to produce the desired compositions were mixed, and the mixture was melted in covered platinum crucibles for 1–2 hours at 1200° C. in air to produce a glass melt. The glass melt then was cast to produce a precursor glass.

Examples of representative precursor glass compositions obtained are listed in Table 1 below. Precursor glasses having the appearance of clear glass are desirable for ceramming to produce the transparent glass-ceramic compositions of the present invention.

Figure 5:
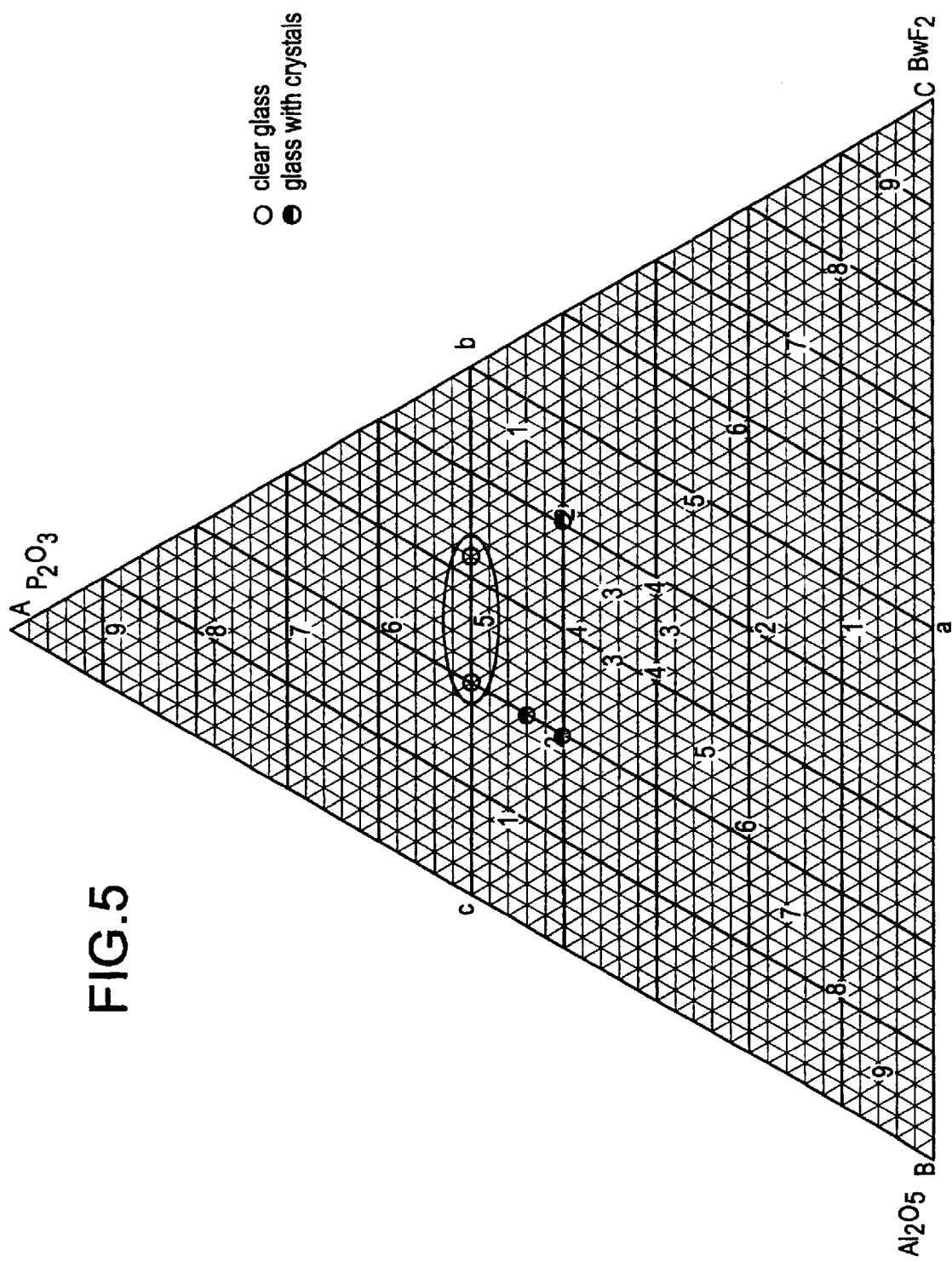
FIG. 5 is a diagram showing the optimum region for forming a glass-ceramic of the present invention.

Thus, compositions 1–3, 7, 11, 18, 21, 27–30, 34, 35, 41, and 42 are desirable precursor glasses. FIG. 5 illustrates an optimum region for forming desirable precursor glasses.

Example 2

A transparent glass-ceramic material with lanthanum fluoride crystals having a composition as shown in Table 2 below was prepared by first preparing the precursor glass as described in Example 1. The precursor glass then was cerammed at 680° C. to produce a transparent glass-ceramic material.

TABLE 2

| | |
|---|---|
| $LaF_3$ | 47.5 wt. % |
| $B_2O_3$ | 25 wt. % |
| $PbF_2$ | 10 wt. % |
| $Al_2O_3$ | 15 wt. % |
| $Er_2O_3$ | 2.5 wt. % |

A comparison of the emission spectra of this sample (line 1) versus the emission spectra of a pure fluoride glass (line 2) at 1550 nm is shown in FIG. 1. Importantly, the transparent glass-ceramic has a long, very flat plateau, extending to 1560 nm, indicating that this material is useful as an amplifier host, because of the uniform gain in this area.

TABLE 1

| ID | $La_2O_3$ | $LaF_3$ | $B_2O_3$ | $PbF_3$ | PbO | $Al_2O_3$ | $Y_2O_3$ | $ZnF_2$ | $BPO_4$ | $BaF_2$ | $SiO_2$ | $Ta_2O_3$ | Appearance |
|---|---|---|---|---|---|---|---|---|---|---|---|---|---|
| 1 | 50 | | 25 | | | | | | | | 25 | | clear glass |
| 2 | 37.5 | 12.5 | 25 | | | | | | | | 25 | | clear glass |
| 3 | 12.5 | 37.5 | 25 | | | | | | | | 25 | | clear glass |
| 4 | | 50 | 25 | | | | | | | | 25 | | crystals/glass |
| 5 | | 50 | 25 | 25 | | | | | | | | | crystals/glass |
| 6 | | 40 | 25 | 25 | | | | | | | 10 | | devitrified |
| 7 | | 40 | 25 | 25 | 10 | | | | | | | | clear glass |
| 8 | | 50 | 20 | 10 | | | | | | | 10 | | phase separated |
| 9 | | 50 | 20 | | 25 | 5 | | | | | | | devitrified |
| 10 | | 50 | 25 | | 15 | 10 | | | | | | | hazy glass |
| 11 | | 50 | 25 | | 10 | 15 | | | | | | | clear glass |
| 12 | | 50 | 25 | | | 25 | | | | | | | didn't melt |
| 13 | | 50 | 25 | | 5 | 15 | 5 | | | | | | crystals glass |
| 14 | | 50 | 25 | | 5 | 20 | 5 | | | | | | didn't melt |
| 15 | | 50 | 25 | | | 15 | | 10 | | | | | partly melted |
| 16 | | 50 | 20 | | 15 | 15 | | | | | | | surface crystals/glass |
| 17 | | 50 | 15 | | 25 | 10 | | | | | | | devitrified |
| 18 | | 50 | 25 | 5 | 5 | 15 | | | | | | | clear glass |
| 19 | | 50 | 25 | 10 | | 15 | | | | | | | devitrified |
| 20 | | 45 | 25 | 10 | | 15 | | | | | | | 5 $ErF_3$, clear glass |
| 21 | | 50 | 25 | 10 | | 15 | | | | | | | clear glass |
| 22 | | 50 | | 10 | | 15 | | | 25 | | | | didn't melt |
| 23 | | 50 | 25 | 10 | | 7.5 | 7.5 | | | | | | surface devit |
| 24 | | 50 | 20 | 15 | | 7.5 | 7.5 | | | | | | devitrified |
| 25 | | 50 | 25 | | | 7.5 | 7.5 | 10 | | | | | devitrified |
| 26 | | 50 | 20 | | 10 | 15 | | | | 5 | | | devitrified |
| 27 | | 50 | 25 | 10 | | 10 | | | | 5 | | | clear glass |
| 28 | | 50 | 25 | 10 | | 5 | | | | 10 | | | clear glass |
| 29 | | 50 | 25 | 5 | | 10 | | | | 10 | | | clear glass |
| 30 | | 50 | 25 | | | 10 | | | | 15 | | | clear glass |
| 31 | | 50 | 20 | | | 10 | | | | 15 | 5 | | surface devit. |
| 32 | | 50 | 20 | | | 10 | | | | 20 | | | surface devit. |
| 33 | | 50 | 22.5 | | | 15 | | | | 10 | | | 2.5 AgF, devit |
| 34 | | 50 | 25 | | | 10 | | | | 15 | | | clear glass |
| 35 | | 50 | 25 | | | 10 | | | | 15 | | | clear glass |
| 36 | | 50 | 22.5 | | | 17.5 | | | | 10 | | | few crystals |
| 37 | | 50 | 22.5 | | | 12.5 | 5 | | | 10 | | | clear glass |
| 38 | | 50 | 20 | | | 12.5 | 7.5 | | | 10 | | | surface devit. |
| 39 | | 50 | 22.5 | | | 10 | 5 | | | 10 | | | 2.5 $A_2F_3$, s. crystals |
| 40 | | 50 | 22.5 | | | 5 | 5 | | | 12.5 | | | 5 $AlF_3$, s. crystals |
| 41 | | 50 | 20 | | | 10 | 5 | | | 10 | 5 | | clear glass |
| 42 | | 50 | 15 | | | 10 | 5 | | | 10 | 10 | | clear glass |

Example 3

A transparent glass-ceramic having lanthanum fluoride crystals having a composition shown in Table 3 below was prepared as described in Example 2.

TABLE 3

| | |
|---|---|
| LaF$_3$ | 50 wt. % |
| B$_2$O$_3$ | 20 wt. % |
| Al$_2$O$_3$ | 10 wt. % |
| PbO | 20 wt. % |

Figure 2:
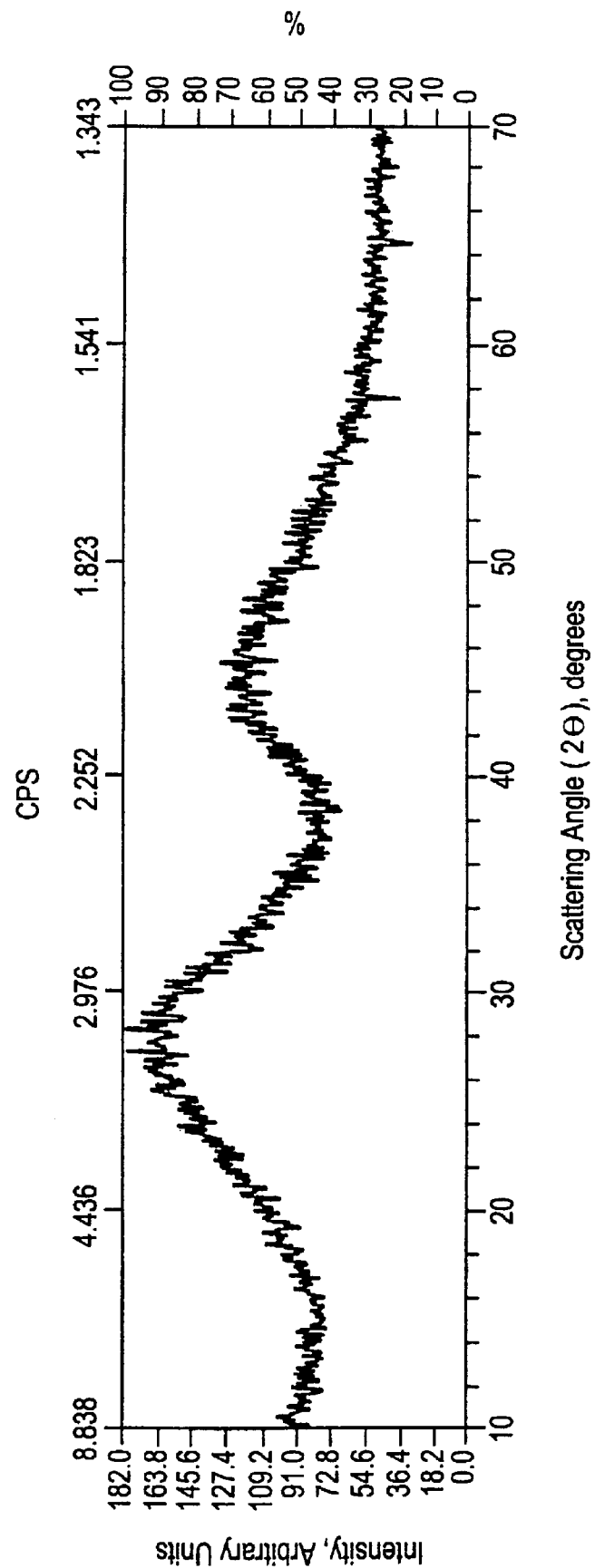
FIG. 2 is an X-ray diffraction pattern of a precursor glass of the present invention.

As shown in FIG. 2, after melting and before ceramming, X-ray diffraction indicates that the precursor material was a glass, with no crystalline phase present. As shown in FIG. 3, after ceramming, a glass-ceramic was present, having a crystalline LaF$_3$ phase.

Example 4

A transparent glass-ceramic having lanthanum fluoride crystals having a composition shown in Table 4 below was prepared.

TABLE 4

| | |
|---|---|
| LaF$_3$ | 50 wt. % |
| B$_2$O$_3$ | 25 wt. % |
| Al$_2$O$_3$ | 15 wt. % |
| PbF$_2$ | 10 wt. % |

Figure 4:
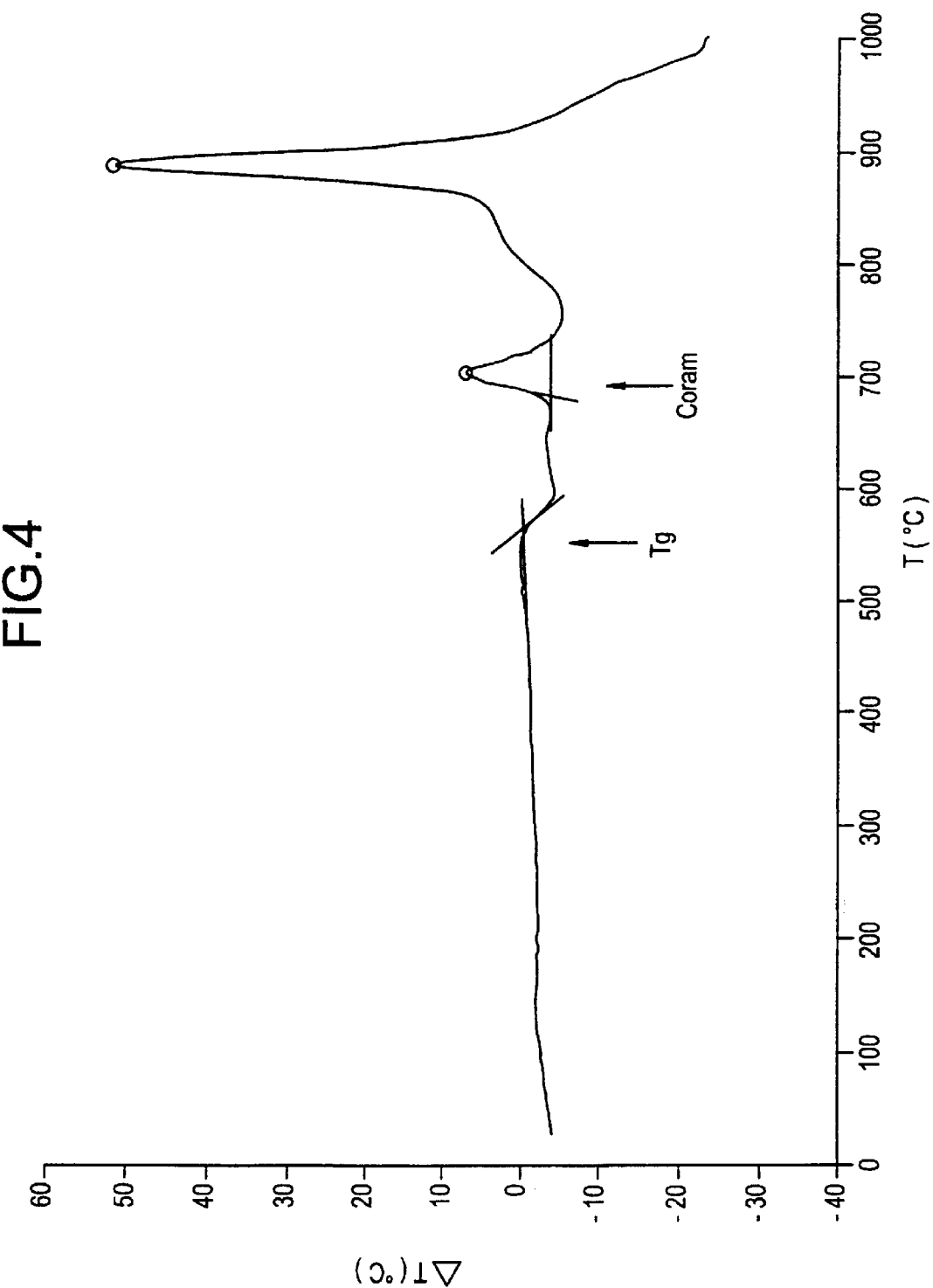
FIG. 4 is a Differential Thermal Analysis ("DTA") curve showing the position of the glass transition temperature (Tg) and the crystallization temperature required to produce a glass-ceramic of the present invention.

As shown in FIG. 4, a Differential Thermal Curve indicates the glass transition temperature (Tg) of about 550° C. for the composition and the ceramming temperature (Tc) of approximately 700° C. Specifically, the onset Tg was 567° C., with a midpoint of 575° C. At a temperature of approximately 890° C., additional undesirable crystallization occurs, indicating that lower ceramming temperatures are necessary to produce the glass-ceramic material of the present invention.

The optimum region for forming a four component system of the inventive glass-ceramic is shown in FIG. 5. In this model, the glass ceramic is comprised of 50 wt. % LaF$_3$, and 50 wt. % (B$_2$O$_3$+BaF$_2$+Al$_2$O$_3$). The region indicated in FIG. 5 represents the optimum region for components B$_2$O$_3$, BaF$_2$ and Al$_2$O$_3$.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A transparent glass-ceramic material comprising:
    a glass matrix and
    a crystalline phase of lanthanum fluoride crystals in the glass matrix, wherein the transparent glass-ceramic material contains no silica.
2. The transparent glass-ceramic material according to claim 1, wherein the lanthanum fluoride crystals have a uniform size distribution.
3. The transparent glass-ceramic material according to claim 2, wherein the lanthanum fluoride crystals have a size of no greater than about 15 nanometers.
4. The transparent glass-ceramic material according to claim 1, wherein the transparent glass-ceramic material comprises: 45 to 55 wt. % LaF$_3$, 20–25 wt. % B$_2$O$_3$, 10–20 wt. % Al$_2$O$_3$, and 10–15 wt. % BaF$_2$.
5. The transparent glass-ceramic material according to claim 4 further comprising: 0–15 wt. % PbF$_2$, 0–10 wt. % Y$_2$O$_3$ and 0–10 wt. % Ta$_2$O$_5$.
6. The transparent glass-ceramic material according to claim 4, further comprising:
    up to 5wt. % fluorides or oxides of one or more additional rare-earth elements.
7. The transparent glass-ceramic material according to claim 6, wherein the additional rare-earth elements are selected from the group consisting of Y, Ce, Pr, Nd, Pm, Sm, Eu, Gd, Tb, Dy, Ho, Er, Tm, Yb, and Lu.
8. The transparent glass-ceramic material according to claim 7, wherein the additional rare-earth elements are contained entirely in the crystalline phase.
9. The transparent glass-ceramic material according to claim 7, wherein the additional rare-earth elements are contained both in the glass matrix and in the crystalline phase.
10. A method of making a transparent glass-ceramic material comprising:
    providing a glass matrix and treating the glass matrix under conditions
    effective to produce the transparent glass-ceramic material comprising a glass matrix and a crystalline phase of lanthanum fluoride crystals in the glass matrix, wherein the transparent glass-ceramic material contains no silica.
11. The method according to claim 10, wherein the transparent glass-ceramic material comprises: 45 to 55 wt. % LaF$_3$, 20–25 wt. % B$_2$O$_3$, 10–20 wt. % Al$_2$O$_3$, and 10–15 wt. % BaF$_2$.
12. The method according to claim 11, wherein the transparent glass-ceramic material further comprises: 0–15 wt. % PbF$_2$, 0–10 wt.% Y$_2$O$_3$ and 0–10 wt. % Ta$_2$O$_5$.
13. The method according to claim 11, wherein the transparent glass-ceramic material further comprises:
    up to 5 wt. % fluorides or oxides of one or more additional rare-earth elements.
14. The method according to claim 13, wherein the additional rare-earth elements are selected from the group consisting of Y, Ce, Pr, Nd, Pm, Sm, Eu, Gd, Tb, Dy, Ho, Er, Tm, Yb, and Lu.
15. The method according to claim 14, wherein the additional rare-earth elements are contained entirely in the crystalline phase.
16. The method according to claim 14, wherein the additional rare-earth elements are contained both in the crystalline phase and in the glass matrix.
17. The method according to claim 10, wherein the providing comprises:
    melting the glass matrix to produce a glass melt and forming the glass melt into a glass shape.
18. The method according to claim 17, wherein the melting is performed at temperatures from about 1000° C. to about 1200° C. for about .25 to 2 hours.
19. The method according to claim 10, wherein the treating comprises:
    heating the glass matrix to form the transparent glass-ceramic material comprising a crystalline phase of lanthanum fluoride crystals in the glass matrix.
20. The method according to claim 19, wherein the heating comprises:
    heating the glass matrix at a temperature from about 600° C. to about 700° C.
21. A product prepared by the method according to claim 10.
22. A product prepared by the method according to claim 17.
23. A product prepared by the method according to claim 20.

* * * * *